United States Patent
Schaefer

(10) Patent No.: US 9,416,863 B2
(45) Date of Patent: Aug. 16, 2016

(54) PULLEY RING

(71) Applicant: Schaeffler Technologies GmbH & Co. KG, Herzogenaurach (DE)

(72) Inventor: Peter Schaefer, Brownstown, MI (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 148 days.

(21) Appl. No.: 14/282,459

(22) Filed: May 20, 2014

(65) Prior Publication Data

US 2014/0357439 A1    Dec. 4, 2014

Related U.S. Application Data

(60) Provisional application No. 61/828,341, filed on May 29, 2013.

(51) Int. Cl.
| | |
|---|---|
| *F16H 55/36* | (2006.01) |
| *F16H 55/49* | (2006.01) |
| *F16H 55/50* | (2006.01) |
| *F16H 7/20* | (2006.01) |
| *F16H 55/48* | (2006.01) |

(52) U.S. Cl.
CPC ..................... *F16H 55/48* (2013.01)

(58) Field of Classification Search
CPC . F16H 55/36; F16H 2007/0865; F16H 55/48; F16C 13/006; F16C 2361/63
USPC .......................... 474/199, 170, 166
See application file for complete search history.

(56) References Cited

U.S. PATENT DOCUMENTS

| | | | | | |
|---|---|---|---|---|---|
| 3,772,928 | A | * | 11/1973 | Gobeille | F16H 55/48 29/892 |
| 3,822,605 | A | * | 7/1974 | Schurger | D06F 37/00 474/199 |
| 3,990,136 | A | * | 11/1976 | Hishida | B23P 15/14 264/263 |
| 3,996,810 | A | * | 12/1976 | Groff | B62D 55/0966 305/136 |
| 4,098,137 | A | * | 7/1978 | Yaros | B21D 53/261 29/892.1 |
| 4,103,558 | A | * | 8/1978 | Peabody | B60B 3/08 305/100 |
| 4,468,210 | A | * | 8/1984 | McCutchan, Jr. | F16H 55/44 474/170 |
| 4,473,363 | A | * | 9/1984 | McCutchan, Jr. | F16H 55/48 474/161 |
| 4,490,128 | A | * | 12/1984 | Weiss | B60B 33/0028 29/892 |
| 4,548,592 | A | * | 10/1985 | Ohhashi | F16H 55/36 474/168 |
| 4,881,426 | A | * | 11/1989 | Serizawa | F16F 15/126 474/166 |
| 5,120,279 | A | * | 6/1992 | Rabe | B29C 37/005 264/46.7 |
| 6,443,280 | B2 | * | 9/2002 | Ouchi | F16D 41/067 192/110 B |

(Continued)

FOREIGN PATENT DOCUMENTS

| | | |
|---|---|---|
| CH | 533261 | 9/1972 |
| DE | 3530190 A1 | 3/1987 |

(Continued)

*Primary Examiner* — Henry Liu
(74) *Attorney, Agent, or Firm* — Antun M. Peakovic

(57) ABSTRACT

A structural or support ring for an overmolded pulley, the ring placed between a bearing and outer radial surface of the pulley, providing structural support across a width of the pulley.

12 Claims, 7 Drawing Sheets

(56) References Cited

U.S. PATENT DOCUMENTS

| | | | | |
|---|---|---|---|---|
| 6,881,166 B1* | 4/2005 | Burkhardt | | F16H 55/50 474/166 |
| 7,011,593 B2* | 3/2006 | Schenk | | F16C 13/006 384/477 |
| 7,041,020 B2* | 5/2006 | Singer | | F16C 13/006 474/152 |
| 7,197,959 B2* | 4/2007 | Crissy | | F16F 15/126 464/90 |
| 7,297,081 B2* | 11/2007 | Eck | | B29C 45/1418 474/161 |
| 7,695,385 B2* | 4/2010 | Barraud | | F16C 19/06 384/484 |
| 7,993,228 B2* | 8/2011 | Nosaka | | F16D 3/68 474/161 |
| 8,172,056 B2* | 5/2012 | Barraud | | F16C 33/58 192/110 B |
| 8,235,851 B2* | 8/2012 | Eidloth | | F16C 13/006 474/199 |
| 8,308,591 B2* | 11/2012 | Hamada | | F16H 7/12 474/185 |
| 8,506,434 B2* | 8/2013 | Harvey | | F16D 47/02 192/41 R |
| 8,617,016 B2* | 12/2013 | Dutil | | F16H 55/36 474/166 |
| 8,840,497 B2* | 9/2014 | Wilson | | F16C 13/006 474/166 |
| 2001/0034281 A1* | 10/2001 | Redmond | | F16H 7/20 474/197 |
| 2004/0166974 A1* | 8/2004 | Hodjat | | F16F 15/126 474/94 |
| 2005/0026729 A1* | 2/2005 | Schenk | | F16C 13/006 474/101 |
| 2006/0084541 A1* | 4/2006 | Nosaka | | F16D 3/68 474/170 |
| 2006/0160647 A1* | 7/2006 | Swane | | F16H 55/36 474/166 |
| 2007/0072714 A1* | 3/2007 | Filip | | F16C 13/006 474/144 |
| 2007/0232427 A1* | 10/2007 | Ueno | | F16H 55/48 474/199 |
| 2008/0220921 A1* | 9/2008 | Yanai | | F16H 55/48 474/199 |
| 2009/0098967 A1* | 4/2009 | Eidloth | | F16C 13/006 474/199 |
| 2009/0186728 A1* | 7/2009 | Nosaka | | F16H 55/36 474/166 |
| 2009/0298629 A1* | 12/2009 | Fujiwara | | F16D 41/061 474/199 |
| 2011/0152025 A1* | 6/2011 | Wilson | | F16C 13/006 474/166 |
| 2011/0300979 A1* | 12/2011 | Dutil | | F16H 55/36 474/166 |
| 2012/0142470 A1* | 6/2012 | Varnnoux | | F16C 13/006 474/199 |

FOREIGN PATENT DOCUMENTS

| | | |
|---|---|---|
| EP | 0020759 A1 | 1/1981 |
| EP | 1062081 B1 | 5/2003 |
| WO | 8001404 A1 | 7/1980 |

* cited by examiner

PULLEY RING

TECHNICAL FIELD

The present disclosure relates to a plastic pulley for an internal combustion engine, in particular, a structural insert ring.

BACKGROUND

Plastic pulleys are used in a variety of applications, including use with the endless drive belt of front end accessory drive (FEAD) systems for vehicles. A plastic pulley for a FEAD is formed by a hollow cylindrical-shaped molded plastic member, having either a flat or smooth outer surface or having a series of V-shaped grooves for receiving grooves of an endless drive belt. A variety of vehicle accessories, such as the water pump, power steering pump, alternator and air conditioning pump are operated by a single drive belt operating on pulleys associated with each accessory, the drive belt driven, in turn, by a pulley connected to the engine crank shaft. In order to avoid slippage, constant loading must be applied to the belt system, typically using belt tensioner assemblies, comprising tensioner arms and tenioner pulleys. In addition, as there are a number of accessories driven by the belt, proper location is a key feature of FEAD systems, requiring idler pulleys placed at application specific locations throughout the system. Width and diameter of a pulley and belt contact interface vary widely.

These various pulleys can carry significant load. In order to support that high load, pulleys can be manufactured from steel, however, the relative high weight and cost of metal pulleys, in addition to the relative difficulty in properly forming metal, creates the need for alternative designs. The use of plastic, or other cast or molded material, is known in the art, however, nylon or plastic has poor structural and dimensional stability and can be subject to excessive wear. In order to avoid these apparent disadvantages, metal, or other material, such as carbon fiber, inserts can be assembled into a plastic pulley body, in such a way that the plastic pulley is assembled or molded on (overmolded) and supported on a disc or sleeve. Overmolded plastic pulleys are known in the art, for example, U.S. Pat. No. 5,120,279, wherein, a rolling bearing functions as a structural metal insert for overmolded plastic. Disc-shaped metal members mounted on an axial face or generally perpendicular to a longitudinal axis of the pulley are also known in the art, for example in U.S. Pat. No. 4,473,363.

As pulley widths and diameters vary and generally increase in size, higher belt forces can cause the outer edges of the pulley to bend toward the longitudinal axis of the pulley, inducing a bending moment. The resulting tensile stresses in the grooves of the pulley can, in turn, cause premature wear, failure and improper loading and running characteristics of the pulley and associated vehicle accessory.

SUMMARY OF THE INVENTION

Certain terminology is used in the following description for convenience and descriptive purposes only, and is not intended to be limiting to the scope of the claims. The terminology includes the words specifically noted, derivatives thereof and words of similar import.

The present invention relates to a pulley, particularly, an overmolded or plastic pulley for an endless drive belt of a front end accessory drive of a vehicle, and more particularly, a structural ring element for an overmolded pulley. The ring is of a hollow, cylindrical form and can have a straight, C-shaped, I-shaped, S-shaped, H-shaped or square shaped cross section. The ring can be overmolded within a material thickness of the pulley, surrounding an overmolded bearing and extend across the width of the flat or v-groove belt supporting interface.

The ring can include surface irregularities, such as knurls, or holes in order to provide more surface area and retention for overmolded material, such as plastic.

BRIEF DESCRIPTION OF DRAWINGS

The above mentioned and other features and advantages of the embodiments described herein, and the manner of attaining them, will become apparent and be better understood by reference to the following description of at least one example embodiment in conjunction with the accompanying drawings. A brief description of those drawings now follows.

DETAILED DESCRIPTION OF THE INVENTION

Identically labeled elements appearing in different ones of the figures refer to the same elements but may not be referenced in the description for all figures. The exemplification set out herein illustrates at least one embodiment, in at least one form, and such exemplification is not to be construed as limiting the scope of the claims in any manner.

Figure 1:
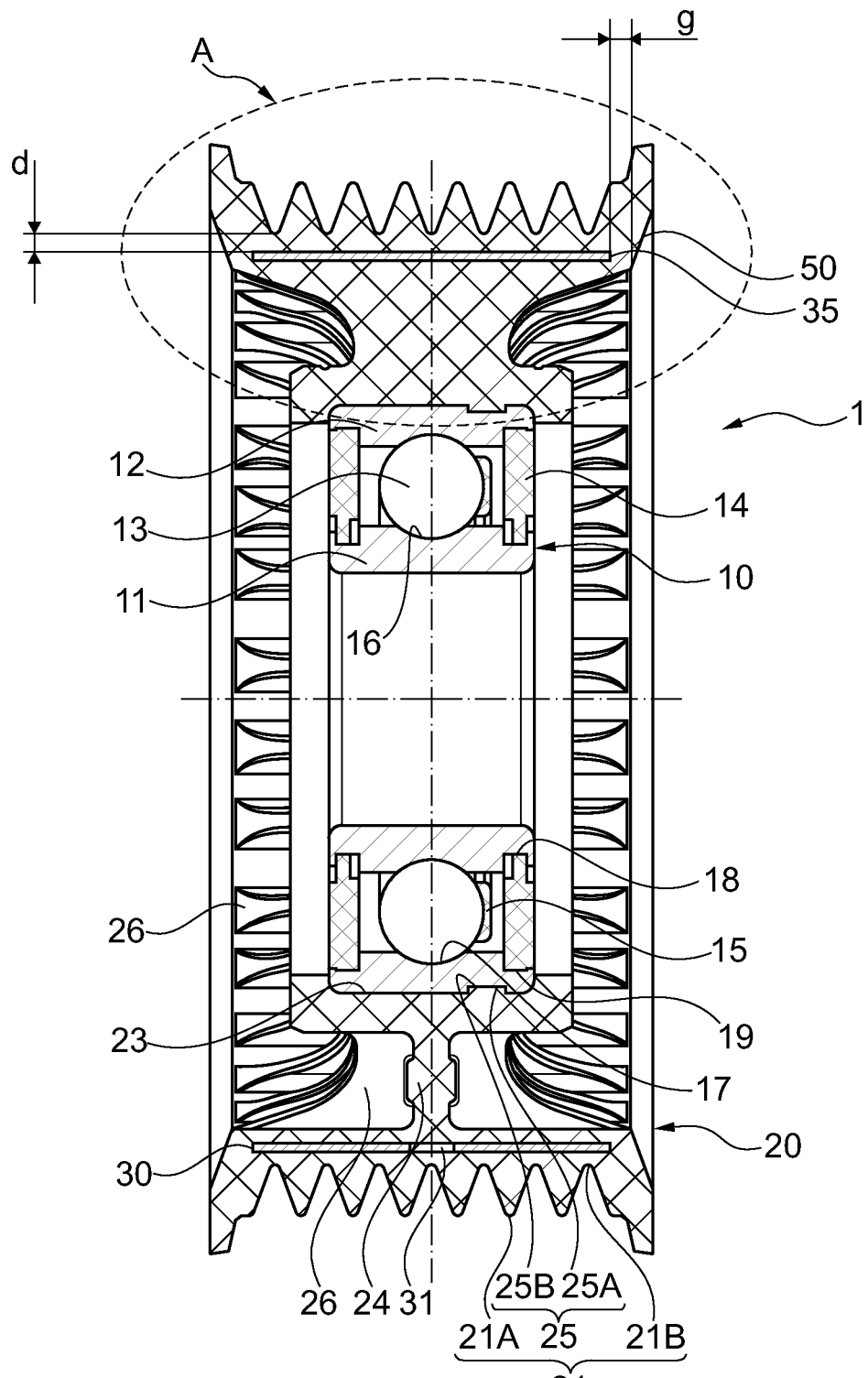
FIG. 1 is a cross sectional view of a pulley including a structural ring, according to one example embodiment.

FIG. 1 is a cross sectional view of pulley 1, comprising bearing 10 and overmolded portion 20. Bearing 10 is shown as a ball bearing, however, any bearing is contemplated by the present invention. Bearing 10 comprises inner ring 11 with inner raceway 16 located on an outer radial circumference, outer ring 12 with outer raceway 17 located on an inner radial circumference, rolling elements 13, shown as balls, arranged between inner raceway 16 and outer raceway 17, seals 14 arranged in grooves 18, 19 in inner and outer rings, respectively, and cage 15, arranged to retain rolling elements within the assembly. Overmolded portion 20 comprises belt contact interface 21, a plurality of structural ribs 22, bearing overmolding interface 23 and support or structural ring 30. Bearing overmolding interface 23 includes retention notch 25, having a protruding overmolded portion 25A and a concave bearing portion 25B. Belt contact interface 21 is shown as a v-groove form, comprising peaks 21A and valleys 21B, however, belt contact interface may also be of other suitable forms known in the art, such as, a flat or smooth contour.

Portion A of FIG. 1 shows a cross section taken through one of structural ribs 22. The opposite radial end of pulley 1 shows a cross section taken through an inter-rib portion 24. As shown, ribs 22 and inter-rib portion 24 alternate at intervals around the entire circumference of pulley 1, forming concave segments 26. Structural ring 30 is shown as having a hollow cylindrical form in this embodiment, positioned between bearing 10 and belt contact interface 21, radially outward from concave segments 26. In this embodiment, bearing 10 and structural ring 30 are overmolded simultaneously with a selected material, for example, plastic, with ring 30 retained within a material thickness t (see FIG. 2) of overmolded portion 20. Ring 30 can have surface irregularities, such as knurls or waves, to create greater surface area for overmolded material, thus having greater retention within overmolded portion 20. In an alternative embodiment, ring 30 can have at least one perforation 31, through which overmolded material may flow and retain ring 30 within portion 20.

Figure 2:
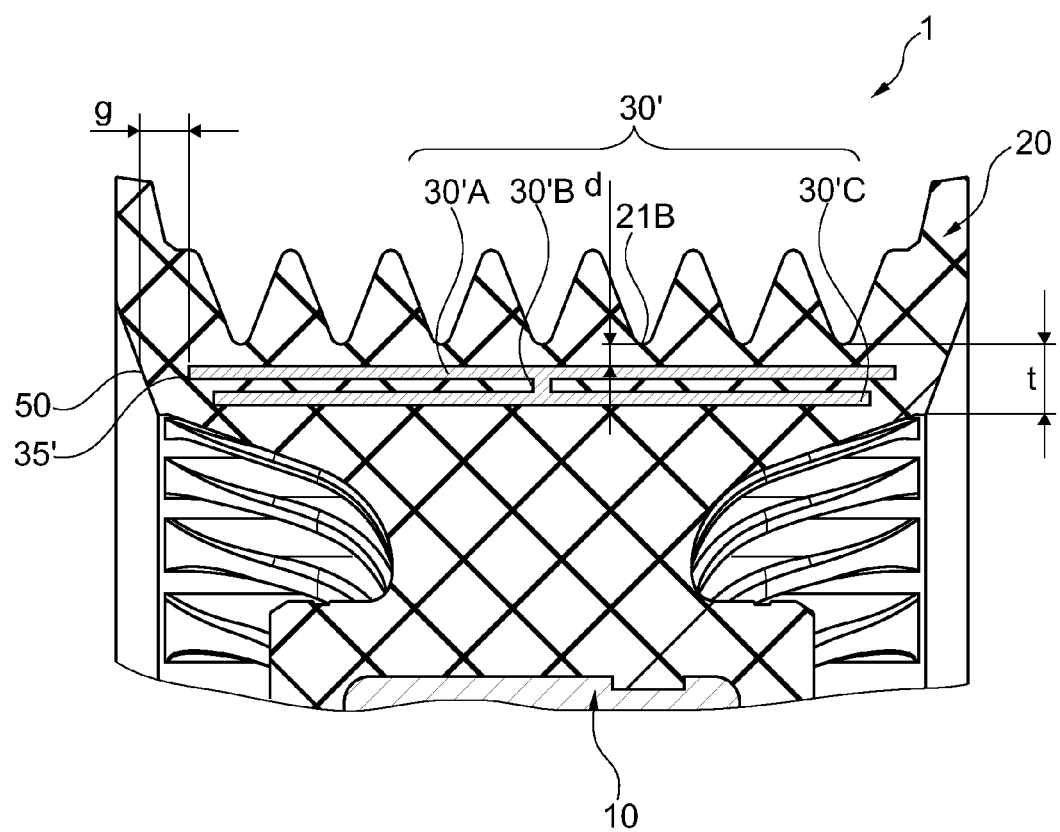
FIG. 2 is an enlarged view of portion A of the pulley of FIG. 1, with a second example embodiment.

FIG. 2 is an enlarged view of portion A of pulley 1 of FIG. 1, showing a second embodiment of the invention. Bearing 10 and overmolded portion 20 remain the same as described above, however, ring 30' is shown as having a cross section of an I-form for increased structural rigidity. I-form of ring 30' comprises outer radial ring 30'A, radial member 30'B and inner radial ring 30'C. As a result of the double ring structure of 30', material thickness t of overmolded portion 20 may have to be increased, but, will depend on specific application requirements, and can be determined by one skilled in the art.

Figure 3:
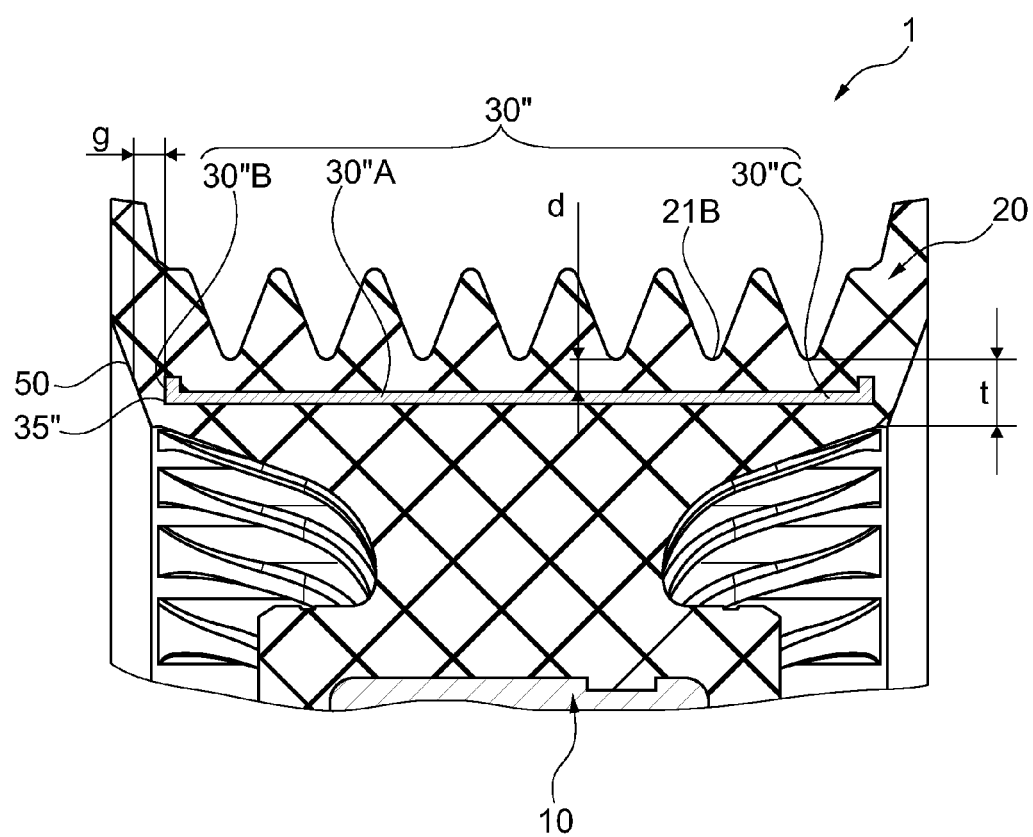
FIG. 3 is an enlarged view of portion A of FIG. 1, with a third example embodiment.

FIG. 3 is an enlarged view of portion A of pulley 1 of FIG. 1, showing a third embodiment of the invention. Bearing 10 and overmolded portion 20 remain the same as described above, however, ring 30" is shown as having a cross section of a C-form or U-form for increased structural rigidity at the axial peripheral ends, where most bending would occur under load. Ring 30" comprises axial cross member 30"A, and at least two radially extending arms 30"B and 30"C, at opposite axial ends of cross member 30"A. Although shown as extending radially outward from cross member 30"A, arms 30"B and 30"C may also extend radially inward.

Figure 4:
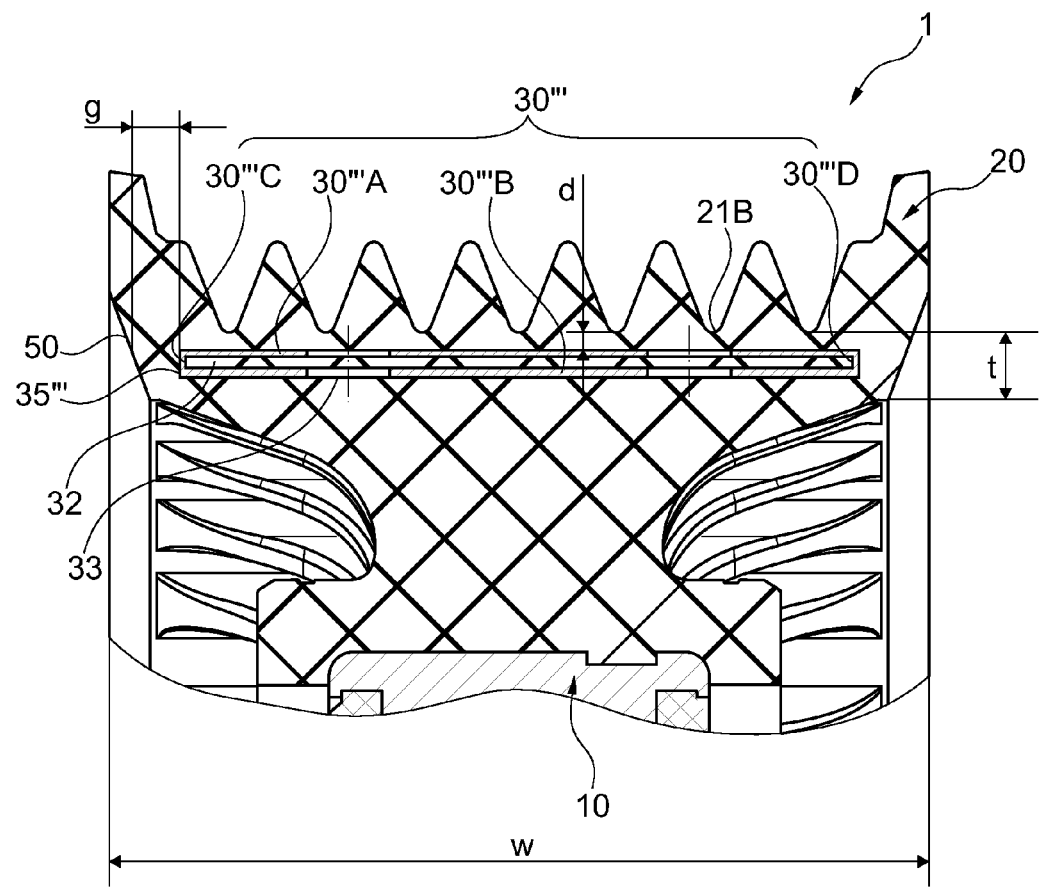
FIG. 4 is an enlarged view of portion A of FIG. 1, with a fourth example embodiment.
Figure 5:
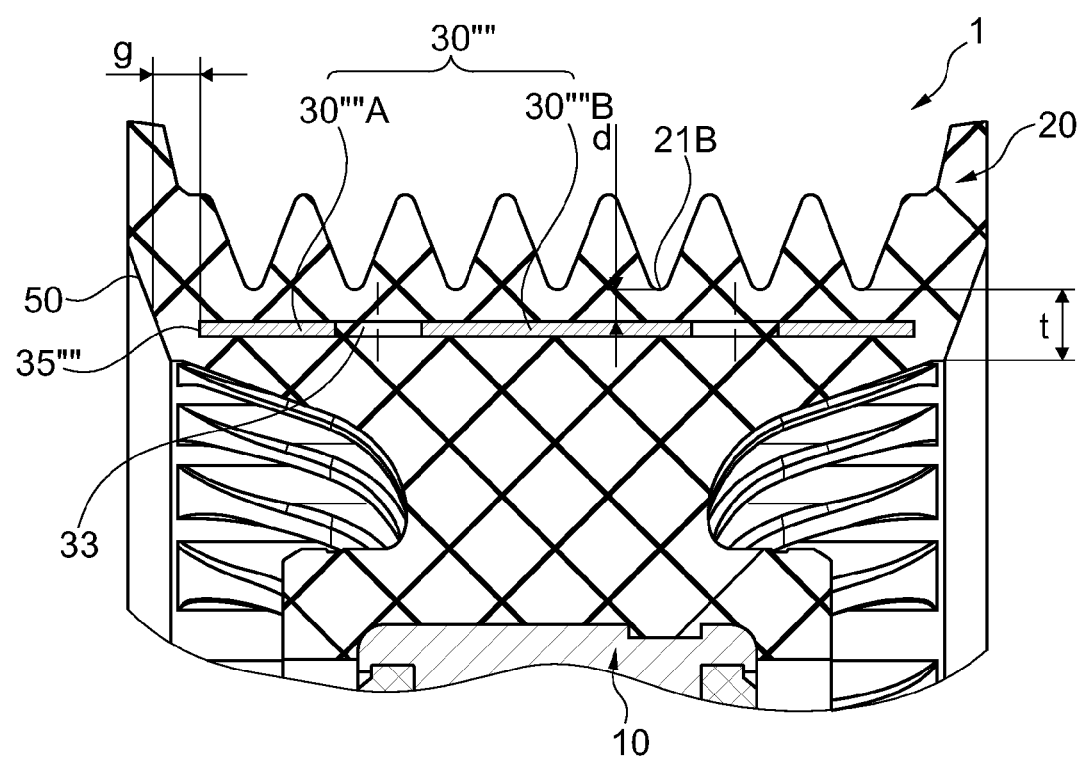
FIG. 5 is an enlarged view of portion A of FIG. 1, with a fifth example embodiment.
Figure 6:
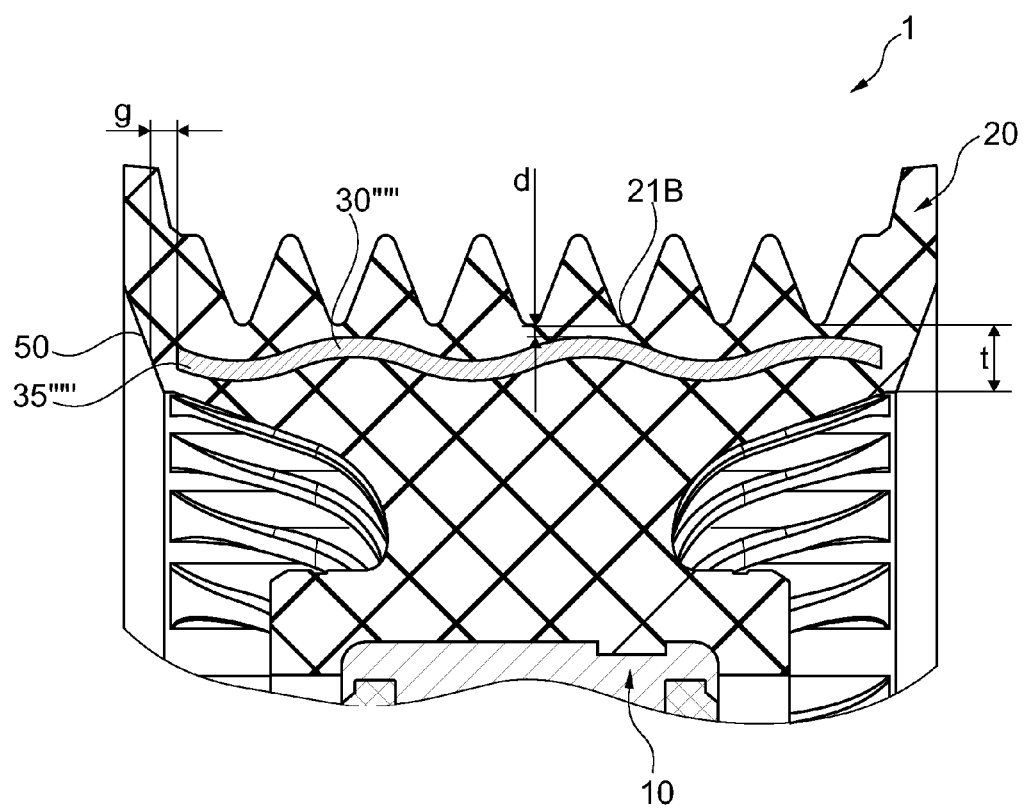
FIG. 6 is an enlarged view of portion A of FIG. 1, with a sixth example embodiment.
Figure 7:
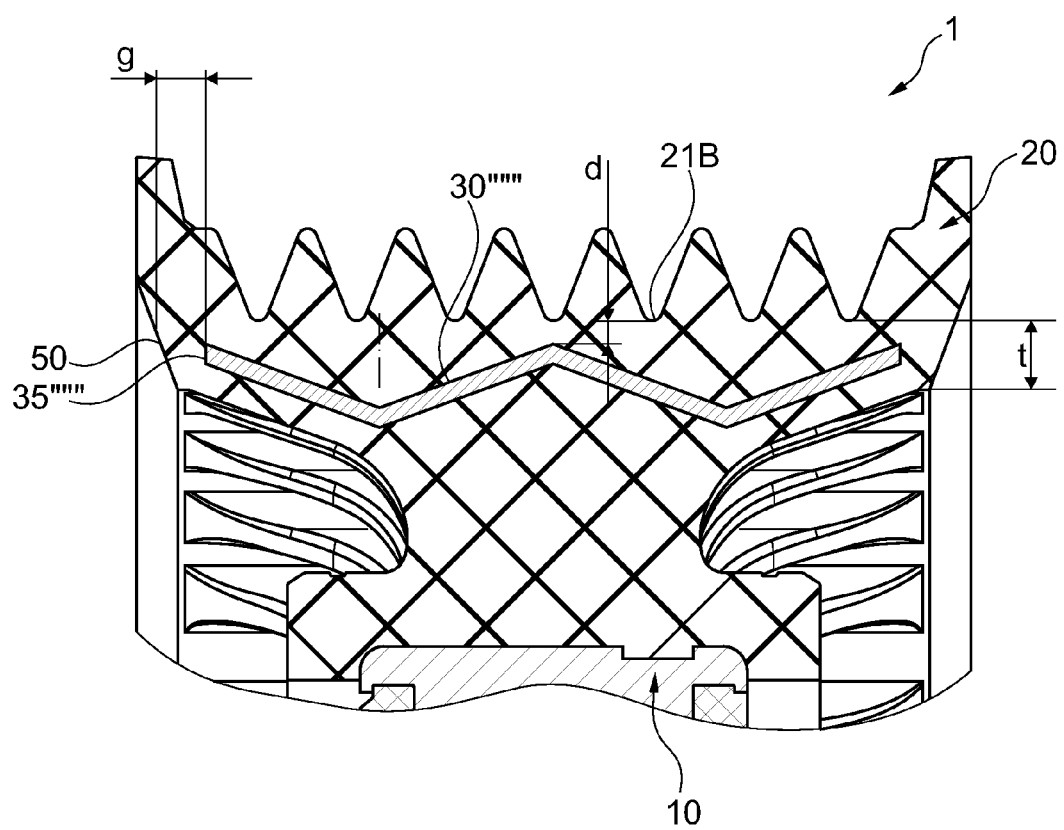
FIG. 7 is an enlarged view of portion A of FIG. 1, with a seventh example embodiment.

FIG. 4 is an enlarged view of portion A of pulley 1 of FIG. 1, showing a fourth embodiment of the invention. Bearing 10 and overmolded portion 20 remain the same as described above, however, ring 30''' is shown as having a cross section of a square-form. Ring 30''' comprises radially outer axial member 30'''A, radially inner axial member 30'''B, and radially extending axial members 30'''C and 30'''D, connecting member 30'''A to 30'''B at opposite axial ends, forming interior cavity 32. In order to improve support and retention in this embodiment, including overmolding material flow into cavity 32, ring 30''' includes a plurality of perforations 33 distributed around a circumference of ring 30'''. Perforations 33 are shown as extending through both members 30'''A and 30'''B, however, it is contemplated in the invention that only one of the members may have perforation 33. In addition, two axial perforations are shown in the same cross section, however, depending on the width w of pulley 1, and material thickness t, the dimensions of ring 30''' could be too narrow to accommodate two such perforations.

In all the embodiments of FIGS. 1-4, rings 30, 30', 30" and 30''' are shown as having a material thickness g, g', g", g''' separating the axial end face 35, 35', 35", 35''', of each ring, respectively, and the axial end face of the adjacent pulley wall 50. It is contemplated by the invention that this thickness, g, g', g" and g''' may be zero, where it is determined that sufficient material retention is present, for example, wherein the respective rings include perforation or other retention features.

In addition, a material depth d, d', d", d''' is shown between the radially outer surfaces of the respective rings and the belt contact interface, in the case of the v-groove shown, valley 21B. This material thickness depends on the application, and geometry of any particular pulley, and would be no less than the thickness required to support calculated contact stresses in the material.

Additional cross sections, such as H-shaped and S-shaped, are also contemplated by the invention.

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

LIST OF REFERENCE SYMBOLS

1 Pulley
10 Bearing
11 Inner Ring
12 Outer Ring
13 Rolling Elements
14 Seal
15 Cage
16 Inner Raceway
17 Outer Raceway
18 Inner Seal Groove
19 Outer Seal Groove
20 Overmolded Portion
21 Belt Contact Interface
22 Structural Ribs
23 Bearing Overmolding Interface
24 Inter-rib Portion
25 Retention Notch
26 Concave Segments
30,30',30",30''' Support or Structural Rings
31 Perforation
32 Square Ring Cavity
33 Square Ring Perforation
35, 35', 35", 35''' Ring Axial End Face
50 Pulley Axial End Face
t Pulley Belt Contact Interface Material Thickness
w Pulley Width
d Ring Radially Outer Surface to Belt Contact Interface Material Thickness
g Ring Axially Outer Surface to Pulley Axial End Face

What I claim is:

1. An overmolded pulley for an accessory drive of an internal combustion engine comprising;
    a bearing comprising;
        an inner ring having a raceway on a radially outer circumference;
        an outer ring having a raceway on a radially inner circumference;
        a plurality of rolling elements arranged between the inner and outer ring raceways;
    an overmolded portion retained on an outer radial surface of the bearing comprising;

a belt contact interface on a radially outer surface;
a plurality of structural ribs distributed on each axial end face, each rib having a first radial end face, a second opposing radial end face and an axial end face;
a plurality of concavities formed by the first radial end face and second radial end face of adjacent ribs, the concavities having a radially outer wall, radially inner wall, a first wall perpendicular to the radial walls and a second wall perpendicular to the radial walls, opposite the first wall;
the overmolded portion having a material thickness between the belt contact interface and the radially outer wall of the concavities, and a width extending from one axial end of the overmolded portion to the opposite end, greater than the maximum width of the structural ribs;
a ring;
the ring having a hollow cylindrical form extending around an entire circumference of the overmolded portion;
the ring positioned between the radially outer surface of the bearing and the belt contact interface of the overmolded portion, radially outward from the radially outer walls of the plurality of concavities;
there being a minimum material thickness from the radially outer surface of the ring to the belt contact interface of the overmolded portion, the thickness no less than required to support contact stresses.

2. The pulley of claim 1, wherein, the ring has straight cross section.

3. The pulley of claim 1, wherein, the ring has an I shaped cross section, comprising a first radially outer axially extending member, a second radially inner axially extending member and a radially extending member connecting the first and the second member.

4. The pulley of claim 1, wherein, the ring has a U shaped cross section, comprising a first axially extending member and first and second radially extending protrusions at axially opposite ends of the first axially extending member.

5. The pulley of claim 1, wherein, the ring has a rectangular cross section comprising a first radially outer axially extending member, a second radially inner axially extending member and first and second radially extending axial members at opposite ends of the first and second axially extending members, and connecting the axially extending members, forming a hollow cavity.

6. The pulley of claim 1, wherein, the ring has surface retention features for overmolding.

7. The pulley of claim 6, wherein, the features are selected from the group waves, knurls or notches.

8. The pulley of claim 1, wherein, the ring has at least one perforation extending through a thickness of the ring, for flow of overmolding material into the perforation to provide retention.

9. The pulley of claim 1, wherein, the overmolded portion is made of a plastic.

10. The pulley of claim 1, wherein, the ring extends across the entire width of the overmolded portion.

11. The pulley of claim 1, wherein, the ring extends no more than three quarters of the width of the overmolded portion.

12. An overmolded pulley for an accessory drive of an internal combustion engine comprising;
a bearing comprising;
an inner ring having a raceway on a radially outer circumference;
an outer ring having a raceway on a radially inner circumference;
a plurality of rolling elements arranged between the inner and outer ring raceways;
an overmolded portion retained on an outer radial surface of the bearing comprising;
a belt contact interface on a radially outer surface;
the overmolded portion having a material thickness extending radially inward from the belt contact interface; and,
a ring having;
a hollow cylindrical form extending around an entire circumference of the overmolded portion;
the ring positioned between the radially outer surface of the bearing and the belt contact interface of the overmolded portion, encased within the material thickness;
wherein there is a minimum thickness from the radially outer surface of the ring to the belt contact interface of the overmolded portion, the thickness no less than required to support contact stresses.

* * * * *